(12) United States Patent
Isayama et al.

(10) Patent No.: US 7,501,080 B2
(45) Date of Patent: Mar. 10, 2009

(54) ELECTRICALLY CONDUCTIVE POLYMER MEMBER, TRANSFER ROLLER, AND IMAGE FORMING DEVICE

(75) Inventors: Kenichi Isayama, Kanagawa (JP); Ryuta Tanaka, Kanagawa (JP)

(73) Assignee: Bridgestone Corporation, Tokyo (JP)

( * ) Notice: Subject to any disclaimer, the term of this patent is extended or adjusted under 35 U.S.C. 154(b) by 52 days.

(21) Appl. No.: 10/579,332

(22) PCT Filed: Nov. 17, 2004

(86) PCT No.: PCT/JP2004/017079

§ 371 (c)(1), (2), (4) Date: Feb. 21, 2007

(87) PCT Pub. No.: WO2005/047395

PCT Pub. Date: May 26, 2005

(65) Prior Publication Data

US 2007/0152193 A1 Jul. 5, 2007

(30) Foreign Application Priority Data

Nov. 17, 2003 (JP) .............................. 2003-386724

(51) Int. Cl.
- H01B 1/00 (2006.01)
- H01B 1/12 (2006.01)
- G03G 15/02 (2006.01)

(52) U.S. Cl. ..................... 252/500; 399/174; 399/176

(58) Field of Classification Search ............... 252/510, 252/511; 399/174, 177
See application file for complete search history.

(56) References Cited

U.S. PATENT DOCUMENTS

| 6,836,636 B2 * | 12/2004 | Saito ............................ 399/313 |
| 2003/0236330 A1 * | 12/2003 | Hattori et al. ................ 524/155 |
| 2004/0106708 A1 * | 6/2004 | Mizumoto et al. ........... 524/242 |

FOREIGN PATENT DOCUMENTS

JP 7-188455 A 7/1995

(Continued)

*Primary Examiner*—Mark Kopec
*Assistant Examiner*—Jaison P Thomas
(74) *Attorney, Agent, or Firm*—Sughrue Mion, PLLC

(57) ABSTRACT

To provide an electrically conductive polymer member, which can be stably used with a reduced variation in electrical resistance even when its use environment is changed or continuous energization is conducted, and furthermore, a transfer roller and an image forming device, which can stably produce good images by using the electrically conductive polymer member.

An electrically conductive polymer member is formed from an electrically conductive polymer material prepared by adding a quaternary ammonium salt and a lithium imide to a base polymer. When the amounts of compounding of the quaternary ammonium salt and the lithium imide are assumed to be x parts by weight and y parts by weight, respectively, it is preferable that x and y satisfy the following formula: $0.009 \leq (y/x) \leq 0.019$. A transfer roller and an image forming device are provided with their respective electrically conductive polymer members.

6 Claims, 1 Drawing Sheet

FOREIGN PATENT DOCUMENTS

| | | |
|---|---|---|
| JP | 11-140306 A | 5/1999 |
| JP | 2002-132020 A | 5/2002 |
| JP | 2002-317114 A | 10/2002 |
| JP | 3357833 B2 | 10/2002 |
| JP | 2003-65393 A | 3/2003 |
| JP | 2003-292770 * | 10/2003 |
| JP | 2003-292770 A | 10/2003 |
| WO | WO 02/17021 * | 2/2002 |

* cited by examiner

ELECTRICALLY CONDUCTIVE POLYMER MEMBER, TRANSFER ROLLER, AND IMAGE FORMING DEVICE

TECHNICAL FIELD

The present invention relates to an electrically conductive polymer member (hereafter may be simply referred to as "a member"), a transfer roller, and an image forming device. In particular, it relates to an electrically conductive polymer member suitable for use as various roller members and the like in image forming devices, e.g., copiers and printers, a transfer roller, and an image forming device.

BACKGROUND ART

In recent years, polymer members formed from polymer materials serving as bass materials have been noted as members used for charging, development, transfer, toner supply, and the like in image forming devices, e.g., dry electrophotographic devices, with progress in the electrophotography. The polymer members have been used in the forms of elastic rollers, e.g., charge rollers, development rollers, transfer rollers, and toner supply rollers. A process of charge, transfer, or the like by using such an elastic roller has advantages that, for example, a required image formation member charge potential and a required amount of toner transfer can be achieved at a lower electric source voltage by using the polymer member as compared with known corotron chargers and the like.

The polymer members used for the above-described applications are required to have appropriate electrical resistance values in accordance with their respective applications and to be capable of stably maintaining the electrical resistance values. In particular, it has become required that the range of variation in electrical resistance value is narrow when the use environment conditions (temperature, humidity) are changed or continuous energization is conducted with speedup and colorization of the electrophotography process in recent years. If a wide range of variation in electrical resistance value is exhibited in this case, a poor image tends to be caused due to an occurrence of poor transfer, poor development, poor charge, or the like. Consequently, a good electrophotographic image may not be produced.

On the other hand, examples of general techniques to control the electrical resistance value of a polymer member include (1) a method in which the electrical conductivity is imparted by adding an electrically conductive agent composed of an electrolyte, (2) a method in which the electrical conductivity is imparted by adding an electrically conductive filler, and (3) a method in which the electrical conductivity is imparted by adding a material capable of forming a charge-transfer complex.

In the method (1), among them, various materials, e.g., carbon black and metal oxides, are used as the electrically conductive agent. For the polymer members including these previously known electrically conductive agents, the electrical resistance values tend to increase in a low-temperature and low-humidity environment but the electrical resistance values tend to decrease in a high-temperature and high-humidity environment on the other hand. Furthermore, the electrical resistance values increase when continuous energization is conducted. Therefore, a poor image tends to be caused due to these variations in electrical resistance values, and the above-described requirements related to the stable electrical resistance cannot be satisfied.

With respect to technologies of improving materials used for the above-described electrically conductive polymer members, for example, Patent Document 1 discloses an electrically conductive member including a polymer material prepared by adding an ionic electrically conductive agent to a predetermined polyurethane based polymer serving as a base material, wherein contamination of other members is prevented and variations in electrical resistance due to environmental changes are reduced. Patent Document 2 discloses an electrically conductive member which is used for OA equipment and which includes a composition composed of a predetermined polyurethane and lithium imide, wherein variations in electrical conductivity during continuous energization and due to changes in environmental conditions are reduced. Furthermore, Patent Document 3 discloses an electrically conductive member including an electrically conductive material containing a predetermined polyurethane foam or an elastomer and an electrical conductivity-imparting agent composed of a quaternary ammonium salt, as a technology of reducing a range of variation in electrical resistance value during continuous energization and due to changes in environmental conditions.

Patent Document 1: Japanese Patent No. 3357833 (Claims and the like)
Patent Document 2: Japanese Unexamined Patent Application Publication No. 2002-317114 (Claims and the like)
Patent Document 3: Japanese Unexamined Patent Application Publication No. 11-140306 (Claims and the like)

DISCLOSURE OF INVENTION

Problems to be Solved by the Invention

As described above, for the electrically conductive polymer member, various researches have been previously conducted on reduction of variations in electrical resistance value during continuous energization and reduction of variations in electrical resistance value with changes in environmental conditions. However, realization of further excellent member performance has been required as higher performance has been required in recent years. Accordingly, the object of the present invention is to provide an electrically conductive polymer member which can be stably used with a reduced variation in electrical resistance even when its use environment is changed or continuous energization is conducted, and a transfer roller and an image forming device which can stably produce good images by using the electrically conductive polymer member.

Means for Solving the Problems

In order to overcome the above-described problems, an electrically conductive polymer member of an aspect of the present invention comprises an electrical conductive polymer material prepared by adding a quaternary ammonium salt and a lithium imide to a base polymer.

In the present aspect, preferably, the above-described base polymer contains a polyether polyol and a polytetramethylene ether glycol. Preferably, when the amounts of compounding of the above-described quaternary ammonium salt and the lithium imide are assumed to be x parts by weight and y parts by weight, respectively, x and y satisfy the following formula:

$$0.009 \leq (y/x) \leq 0.019.$$

Furthermore, preferably, a quaternary ammonium salt of a weak acid group, for example, an alkylsulfate ion, a carboxylate ion, a borate ion, or a carbonate ion is used as the above-described quaternary ammonium salt.

A transfer roller according to another aspect of the present invention comprises the electrically conductive polymer member according to the above-described aspect.

An image forming device according to another aspect of the present invention comprises the transfer roller according to the above-described aspect of the present invention.

Advantages

In the present invention since the quaternary ammonium salt and the lithium imide are used in combination as electrolytes of the electrically conductive agent to be added to the base polymer of the electrically conductive polymer material, it is possible to realize an electrically conductive polymer member, wherein a stable electrical resistance value can be attained, variations in electrical resistance are reduced even when its use environment is changed or continuous energization is conducted, and an occurrence of a poor image due to the variations can be appropriately prevented. For the electrically conductive member, it is known that the quaternary ammonium salt and the lithium imide are used as electrically conductive agents, as described in the above-described Patent Documents 1 to Patent Document 3, for example. However, it has not been previously known that the use of the above-described two electrically conductive agents in combination excellent effect on suppression of variations in electrical resistance value. The present invention has been made based on this new finding.

BRIEF DESCRIPTION OF THE DRAWINGS

FIG. 1 is a schematic diagram showing an example of a transfer device.

FIG. 2 is a graph indicating the relationship between the electrically conductive agent compounding ratio y/x and the sum of a range of variation due to environment and a range of increase due to energization of the electrical resistance value.

Figure 1:
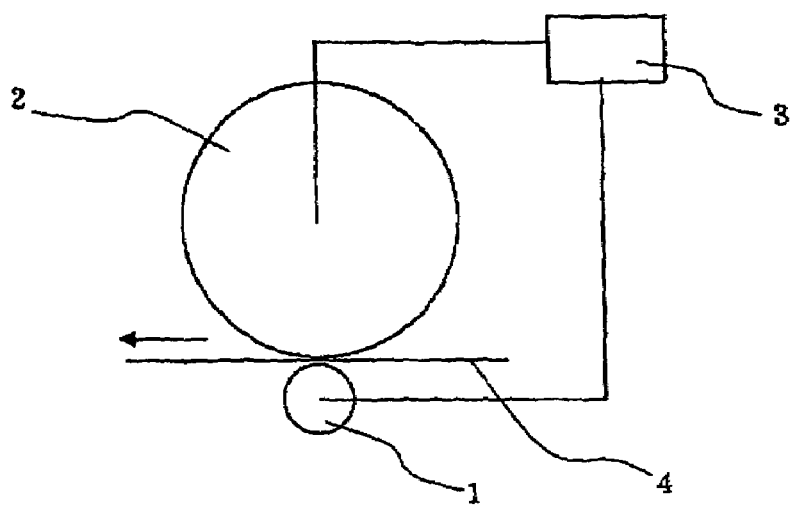
[FIG. 1]

REFERENCE NUMERALS 1 transfer roller
2 image formation member (photosensitive member)
3 power source
4 recording medium (transfer material)

BEST MODE FOR CARRYING OUT THE INVENTION

The base polymer of the electrically conductive polymer material used for the electrically conductive polymer member of the present invention is not specifically limited.

However, polyurethane based polymers are suitable for use. The above-described polyurethane polymer may be either a polyurethane foam or a polyurethane elastomer. For example, polyisocyanate components and polyol components described below can be used as the material therefor.

Aromatic isocyanates, aliphatic isocyanates, alicyclic isocyanates, and derivatives thereof can be used as the polyisocyanate components. Most of all, aromatic isocyanates and derivatives thereof, in particular, tolylene diisocyanate, diphenylmethane diisocyanate, and derivatives thereof are suitable for use.

For example, crude tolylene diisocyanate, 2,4-tolylene diisocyanate, 2,6-tolylene diisocyanate, a mixture of 2,4-tolylene diisocyante and 2,6-tolylene diisocyanate, urea-modified products thereof, buret-modified products thereof, and carbodiimide-modified products hereof are used as tolylene diisocyanate and derivatives thereof.

For example, diphenylmethane diisocyanate and derivatives thereof produced by reacting diaminodiphenylmethane and derivatives thereof with phosgene are used as diphenylmethane dilsocyanate and derivatives thereof. Examples of diaminodiphenylmethane derivatives include polynuclear products, and pure diphenylmethane diisocyanate derived from diaminodiphenylmethane, polymeric.diphenylmethane diisocyanate derived from polynuclear products of diaminodiphenylmethane, and the like can be used. Usually, mixtures of pure diphenylmethane diisocyanate and polymeric.diphenylmethane diisocyanate having various numbers of functional groups are used. With respect to the number of functional groups of polymeric.diphenylmethane diisocyanate, preferably, an average number of functional groups is 2.05 to 4.00, and more preferably is 2.50 to 3.50. Furthermore, derivatives produced by modifying the diphenylmethane diisocyanate and derivatives thereof, for example, urethane-modified products modified by polyol and the like, dimers produced by forming uretidion, isocyanurate-modified products, carbodiimide/uretonimine-modified products, alohanate-modified products, urea-modified products and buret-modified products, can also be used. In addition, several types of diphenylmethane diisocyanate and derivatives thereof and the like may be used in combination.

Polyether polyols prepared by addition polymerization of ethylene oxide and propylene oxide, polytetramethylene ether glycols, polyester polyols prepared by condensation of an acid component and a glycol component, polyester polyols prepared by ring-opening polymerization of caprolactone, polycarbonatediols, and the like can be used as polyol components.

Examples of polyether polyols prepared by addition polymerization of ethylene oxide and propylene oxide can include those in which water, propylene glycol, ethylene glycol, glycerin, trimethylolpropane, hexanetriol, triethanolamine, diglycerin, pentaerythritol, ethylenediamine, methyl glucoside, aromatic diamine, sorbitol, sucrose, phosphoric acid, and the like are used as starting materials, and addition polymerization of ethylene oxide and propylene oxide is conducted. In particular, those in which water, propylene glycol, ethylene glycol, glycerin, trimethylolpropane, and hexanetriol are used as starting materials are suitable for use. With respect to the ratio of ethylene oxide and propylene oxide to be added and the microstructure, preferably, the ratio of ethylene oxide is 2 to 95 percent, by weight, and more preferably is 5 to 90 percent by weight. Preferably, ethylene oxide is added at a terminal. Preferably, ethylene oxide and propylene oxide are arranged at random in a molecular chain.

With respect to the molecular weight of the above-described polyether polyol, in the case where water, propylene glycol, and ethylene glycol are used as starting materials, polyols become difunctional. Preferably, the weight average molecular weight is within the range of 300 to 6,000, and more preferably is within the range of 400 to 3,000. In the case where glycerin, trimethylolpropane, and hexanetriol are used as starting materials, polyols become trifunctional. Preferably, the weight average molecular weight is within the range of 900 to 9,000, and more preferably is within the range of 1,500 to 6,000. Furthermore, difunctional polyols and trifunctional polyols may be used after being appropriately blended.

Polytetramethylene ether glycols can be produced by, for example, cation polymerization of tetrahydrofuran, and those having a weight average molecular weight within the range of 400 to 4,000, particularly within the range of 650 to 3,000 are used preferably. It is also preferable that polytetramethylene ether glycols having different molecular weights are blended. Furthermore, polytetramethylene ether glycols produced by copolymerization of alkylene oxides, e.g., ethylene oxide and propylene oxide, can also be used.

It is also preferable that a polytetramethylene ether glycol and a polyether polyol produced by addition polymerization of ethylene oxide and propylene oxide are used by blending. In this case, it is suitable that these are used at a blending ratio within the range of 95:5 to 20:80, particularly within the range of 90:10 to 50:50.

In addition, polymer polyols produced by acrylonitrile-modification of polyols, polyols produced by adding melamine to polyols, diols, e.g., butanediol, polyols, e.g., trimethylolpropane, and derivatives thereof can also be used in combination with the above-described polyol components.

For these polyol components and polyisocyanate components, polyols may be made into prepolymers by using polyisocyanates. Examples of methods therefor include a method in which a polyol and a polyisocyanate are put in an appropriate container, adequate agitation is conducted, and the temperature is kept at 30° C. to 90° C., preferably at 40° C. to 70° C., for 6 to 240 hours, preferably for 24 to 72 hours.

Examples of catalysts used for a curing reaction of a material for polyurethane include monoamines, e.g., triethylamine and dimethylcyclohexylamine; diamines, e.g., tetramethylethylenediamine, tetramethylpropanediamine, and tetramethylhexanediamine; triamines, e.g., pentamethyldiethylenetriamine, pentamethyldipopyenetriamine, and tetramethylquanidine; cyclic amines, e.g., triethylenediamine, dimethylpiperazine, methylethylpiperazine, methylmorpholine, dimethylaminoethylmorpholine, and dimethylimidazole; alcohol amines, e.g., dimethylaminoethanol, dimethylaminoethoxyethanol, trimethylaminoethylethanolamine, methylhydroxyethylpiperazine, and hydroxyethylmorpholine; etheramines, e.g., bis(dimethylaminoethyl) ether and ethylene glycol (dimethyl)aminopropyl ether; and organometallic compounds, e.g., stannous octoate, dibutyltin diacetate, dibutyltin dilaurate, dibutyltin mercaptide, dibutyltin thiocarboxylate, dibutyltin dimaleate, dioctyltin mercaptide, dioctyltin thiocarboxylate, phenylmercury propionate, and lead octenoate. These catalysts may be used alone or at least two types thereof may be used in combination.

Various quaternary ammonium salts can be used as electrically conductive agents to be added, and are not specifically limited. Examples thereof include those represented by the following general formula (I).

[Chemical formula 1]

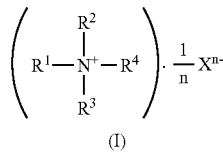

(I)

(In the formula, $R^1$ represents an alkyl group having the carbon number of 1 to 30, an aryl group having the carbon number of 6 to 30, or an aralkyl group having the carbon number of 7 to 30, $R^2$, $R^3$, and $R^4$ independently represent an alkyl group having the carbon number of 1 to 6, $X^{n-}$ represents an n-valent negative ion, and n represents an integer of 1 to 6)

In the above-described general formula (I), the alkyl group having the carbon number of 1 to 30 represented by $R^1$ may be any one of straight-chain type, branch type, and ring type. Examples thereof include a methyl group, an ethyl group, a propyl group, a butyl group, a hexyl group, an octyl group, a nonyl group, a decyl group, a dodecyl group, a tetradecyl group, a hexadecyl group, an octadecyl group, an eicocyl group, a cyclopentyl group, a cyclohexyl group, a cyclooctyl group, and a cyclododecyl group. Examples of aryl groups having the carbon number of 6 to 30 include a phenyl group and a naphthyl group. Examples of aralkyl groups having the carbon number of 7 to 30 include a benzyl group, a phenethyl group, and a naphthylmethyl group. A lower alkyl group, a lower alkoxy group, or an appropriate inert group, e.g., halogen, may be introduced on a carbon ring of the above-described aryl group and aralkyl group.

The alkyl group having the carbon number of 1 to 6 represented by $R^2$, $R^3$, or $R^4$ may be any one of straight-chain type, branch type, and ring type. Examples thereof include a methyl group, an ethyl group, a propyl group, a butyl group, a pentyl group, a hexyl group, a cyclopentyl group, and a cyclohexyl group. $R^2$, $R^3$, and $R^4$ may be the same group or be different from each other.

Examples of negative ions represented by $X^{n-}$ include carboxylic acid (organic acid) ions, e.g., an oxalate ion, a malonate ion, a maleate ion, an acetate ion, a malate ion, a succinate ion, a tartrate ion, a fumarate ion, a benzoate ion, a phthalate ion, an isophthalate ion, a terephthalate ion, a trimellitate ion, a trimesate ion, and a tricarbarate ion; a sulfate ion; an alkylsulfate ion; a borate ion; a carbonate ion; halogen ions, e.g., $Cl^-$, $F^-$, $Br^-$, and $I^-$; $ClO_4^-$; and $BF_4^-$. Weak acid groups, e.g., an alkylsulfate ion, a borate ion, a carbonate ion, and a carboxylate ion, are preferable.

Examples of quaternary ammonium salts represented by the above-described general formula (I) include salts of quaternary ammoniums, e.g., tetraethylammonium, tetrabutylammonium, benzyltrimethylammonium, dodecyltrimethylammonium (lauryltrimethylammonium), hexadecyltrimethylammonium, octadecyltrimethylammonium (stearyltrimethylammonium), and modified aliphatic dimethylethylammonium, and carboxylic acid, e.g., acetic acid, oxalic acid, malonic acid, malic acid, succinic acid, tartaric acid, maleic acid, fumaric acid, benzoic acid, phthalic acid, isophthalic acid, terephthalic acid, trimellitic acid, trimesic acid, and tricarbaric acid; alkylsulfuric acid; boric acid; and carbonic acid. Specific examples of salts include benzyltrimethylammonium oxalate, benzyltriethylammonium oxalate, tetrabutylammonium oxalate, benzyltrimethylammonium malonate, benzyltriethylammonium malonate, tetrabutylammonium malonate, benzyltriethylammonium maleate, tetrabutylammonium maleate, and ethylsulfate-modified aliphatic dimethylethylammonium. These quaternary ammonium salts may be used alone or at least two types thereof may be used in combination.

With respect to the lithium imide used in combination with the quaternary ammonium salt in the present invention as well, various compounds may be used, and are not specifically limited. Examples thereof include lithium bis(trifluoromethylsulfonyl)imide ($Li(CF_3SO_2)_2N$) and lithium bis(trifluoroethylsulfonyl)imide ($Li(C_2H_2F_3SO_2)_2N$).

The amounts of addition of these quaternary ammonium salt and lithium imide are not specifically limited, and can be appropriately selected in accordance with the use of the member. In general, these are compounded by about 0.001 to 5 parts by weight, preferably about 0.05 to 2 parts by weight in total relative to 100 parts by weight of base polymer. In this manner, an electrically conductive polymer member having an appropriate electrical resistance value within a medium resistance range of $10^4$ to $10^{10}$ Ω can be produced.

With respect to the compounding ratio of these quaternary ammonium salt and lithium imide, when the amounts of them are assumed to be x parts by weight and y parts by weight, respectively, it is preferable that the ratio of y to x satisfies the following formula;

$$0.009 \leq (y/x) \leq 0.019.$$

In the present invention, the effect of reducing variations in electrical resistance value can be more excellently exerted by compounding each of the quaternary ammonium salt and the lithium imide in such a way that the above-described formula is satisfied.

In consideration of uses, fillers, e.g., an inorganic carbonate; foam stabilizers, e.g., a silicone foam stabilizer and various surfactants; antioxidants, e.g., phenol and phenylamine; friction reduction agents; charge regulators; and the like can be appropriately added to the electrically conductive polymer material according to the present invention. For the silicone foam stabilizer, among them, a dimethyl polysiloxane-polyoxyalkylene copolymer or the like is suitable for use, and it is particularly preferable that the copolymer is composed a dimethyl polysiloxane section having a molecular weight of 350 to 15,000 and a polyoxyalkylene section having a molecular weight of 200 to 4,000. Preferably, the molecular structure of the polyoxyalkylene section is an addition polymerization product of ethylene oxide or an addition copolymerization product of ethylene oxide and propylene oxide, and it is also preferable that a molecular terminal thereof is ethylene oxide. Examples of surfactants include ionic surfactants, e.g., cationic surfactants, anionic surfactants, and amphoteric surfactants, and nonionic surfactants, e.g., various polyethers and various polyesters. Preferably, the amounts of compounding of the silicone foam stabilizer and various surfactants are 0.1 to 10 parts by weight relative to 100 parts by weight of the base polymer, and more preferably is 0.5 to 5 parts by weight.

It is essential only that the electrically conductive polymer member includes the above-described electrically conductive polymer material, and a specific shape or the like is not specifically limited. For example, in the case where an electrically conductive roller is prepared, it can be configured by coating a core metal composed of a plated iron or a stainless steel with the above-described electrically conductive polymer material. In this case, the outside thereof may be painted with an electrically conductive, semiconductive, or insulating paint depending on uses. Furthermore, uses of the electrically conductive polymer member of the present invention are not specifically limited. For example, the polymer member is suitable for use as a charge member, a development member, a transfer member, a toner supply member, or a cleaning member in an image formation device.

FIG. 1 shows a schematic diagram of an example of a transfer device. In the transfer device shown in the drawing, a transfer roller 1 is brought into contact with an image formation member (photosensitive member) 2 with a recording medium (transfer material) 4 therebetween, a voltage is applied between the transfer member 1 and the image formation member 2 from a power source 3, an electric field is generated between the image formation member 2 and the transfer member 1 and, thereby, the toner on the image formation member 2 is transferred to the recording medium 4. The electrically conductive polymer member of the present invention can be used as the transfer roller 1 in, for example, the transfer device shown in the drawing.

It is essential only that the above-described electrically conductive polymer member of the present invention is used as a charge member, a development member, a transfer member, a toner supply member, a cleaning member, or the like in the image forming device of the present invention, and other specific structure and the like are not specifically limited.

EXAMPLES

Example 1

Preparation of Roller

Sixty parts by weight of polyether polyol which was produced by adding propylene oxide and ethylene oxide to glycerin at random and which had a content of ethylene oxide unit of 16%, the number of functional group of substantially 3, a molecular weight of 5,000, and an OH value of 34; 40 parts by weight of polytetramethylene ether glycol having a molecular weight of 1,000 and an OH value of 113; 22 parts by weight of isocyanate which was a mixture of diphenylmethane diisocyanate, urethane-modified diphenylmethane diisocyanate, and carbodiimide-modified diphenylmethane diisocyanate and which had a content of isocyanate of 26.3%; 4 parts by weight of silicone foam stabilizer which was a dimethylpolysiloxane-polyoxyalkylene copolymer and which had an OH value of 32; 0.333 parts by weight of ethyl sulfate-modified aliphatic dimethylethylammonium; 0.0045 parts by weight of lithium bis(trifluoromethylsulfonyl) imide ($Li(CF_3SO_2)_2N$); 0.013 parts by weight of dibutyltin dilaurate; and 2.5 parts by weight of black coloring agent which was prepared by dispersing black pigment in polyol and which had an OH value of 45 were mixed while being foamed by mechanical agitation. The resulting mixture was cast into a mold provided with a core metal formed from a metal having a diameter of 6 mm at the center and, thereafter, curing was conducted at 90° C. for 6 hours, so that an urethane foam roller having a diameter of 16.5 mm and a length of 215 mm was prepared. The bulk density of the foam section was 0.40 g/ml, and the Asker C hardness was 40°.

Test of Variations in Electrical Resistance Due to Environment

The above-described roller was put on an aluminum plate of 5 mm thickness, and the electrical resistance between the roller core metal and a copper plate of a measuring device was measured while each of the two ends of the roller was press-contacted with the aluminum plate by a force of 500 g. The temperature and the humidity during the measurement were 23° C. and 50% RH, respectively, (room temperature and normal humidity), and the measurement value of electrical resistance was 7.83 [log Ω] at an applied voltage of 1,000 V. Subsequently, in a manner similar to that described above, the electrical resistance was measured at an applied voltage of 1,000 V in an environment in which the temperature and the humidity were 10° C. and 15% RH, respectively, (low temperature and low humidity). The result was 8.66 [log Ω]. Furthermore, in a manner similar to that described above, the electrical resistance was measured at a applied voltage of 1,000 V in an environment in which the temperature and the humidity were 28° C. and 80% RH, respectively, (high temperature and high humidity). The result was 7.16 [log Ω]. The electrical resistance value at room temperature and normal humidity and a range of variation due to the environment, the range being represented by the difference between the electrical resistance at low temperature and low humidity and that at high temperature and high humidity, at this time are shown in Table 1 described below.

Image Evaluation

This roller was incorporated as a transfer roller into an image formation device. After standing for 48 hours under each of temperature and humidity conditions of 23° C./50% RH, 10° C./15% RH, and 28° C./85% RH, gray-scale, solid black, and solid white images were printed. As a result, a good image was produced for each of the gray-scale, solid black, and solid white images.

Continuous Energization Test

This roller was taken off the image formation device, and was rotated for 100 hours while a constant current of 10 μA was flown by using an aluminum drum as a counter electrode in an environment of a temperature of 22° C. and a humidity of 50% RH. Furthermore, after standing for 48 hours in an environment of a temperature of 23° C. and a humidity of 50% RH, the electrical resistance was measured in a manner similar to that described above. The result was 8.17 [log Ω]. The range of increase due to energization is represented by the difference between electrical resistances at room temperature and normal humidity before and after the continuous energization, and is shown in Table 1 described below.

Furthermore, this roller was incorporated again into the image formation device, and gray-scale, solid black, and solid white images were printed under the condition of temperature and humidity of 23° C. and 50% RH, respectively. As a result, a good image was produced for each of the gray-scale, solid black, and solid white images.

Examples 2 to 4

A roller was prepared as in Example 1 except that the amounts of compounding of ethyl sulfate-modified aliphatic dimethylethylammonium and lithium bis(trifluoromethylsulfonyl)imide were changed as shown in Table 1 described below.

Test of Variations in Electrical Resistance Due to Environment

The electrical resistance of each of the above-described rollers was measured under the same condition as that in Example 1. The electrical resistance value at room temperature and normal humidity and a range of variation due to the environment, the range being represented by difference between the electrical resistance at low temperature and low humidity and that at high temperature and high humidity, of each roller at this time are shown in Table 1 described below.

Image Evaluation

The image evaluation of each roller was conducted as in Example. A good image was produced by every roller.

Continuous Energization Test

As in Example 1, the electrical resistance was further measured after the continuous energization was conducted. The range of increase due to energization is represented by the difference between electrical resistances at room temperature and normal humidity before and after the continuous energization, and is shown in Table 1 described below. This roller was incorporated again into the image formation device, and gray-scale, solid black, and solid white images were printed under the condition of temperature and humidity of 23° C. and 50% RH, respectively. As a result, a good image was produced for each of the gray-scale, solid black, and solid white images.

Comparative Example 1

Roller Preparation

A roller was prepared as in Example 1 except that ethyl sulfate-modified aliphatic dimethylethylammonium was not compounded.

Test of Variations in Electrical Resistance Due to Environment

The electrical resistance of the above-described roller was measured under the same condition as that in Example 1. The measurement values of electrical resistance were 7.78 [log Ω] under the condition of temperature and humidity of 23° C. and 50% RH, respectively, 8.58 [log Ω] at 10° C. and 15% RH, respectively, and 7.47 [log Ω] at 28° C. and 85% RH, respectively. The electrical resistance value at room temperature and normal humidity and a range of variation due to the environment, the range being represented by the difference between the electrical resistance at low temperature and low humidity and that at high temperature and high humidity, at this time, are shown in Table 1 described below.

Image Evaluation

The image evaluation of this roller was conducted as in Example 1. A good image was produced in every case.

Continuous Energization Test

Furthermore, as in Example 1, the electrical resistance was measured after the continuous energization was conducted. The measurement value was 11.04 [log Ω]. The range of increase due to energization is represented by the difference between electrical resistances at room temperature and normal humidity before and after the continuous energization, and is shown in Table 1 described below. This roller was incorporated again into the image formation device, and gray-scale, solid black, and solid white images were printed under the condition of temperature and humidity of 23° C. and 50% RH, respectively. As a result, both the gray-scale image and the solid black image looked patchy, and a good image was not produced.

Comparative Example 2

Roller Preparation

A roller was prepared as in Example except that lithium bis(trifluoromethylsulfonyl)imide was not compounded.

Test of Variations in Electrical Resistance Due to Environment

The electrical resistance of the above-described roller was measured under the same condition as that in Example 1. The measurement values of electrical resistance were 7.90 [log Ω] under the condition of temperature and humidity of 23° C. and 50% RH, respectively, 9.00 [log Ω] at 10° C. and 15% RH, respectively, and 6.83 [log Ω] at 28° C. and 85% RH, respectively. The electrical resistance value at room temperature and normal humidity and a range of variation due to the environment, the range being represented by the difference between the electrical resistance at low temperature and low humidity and that at high temperature and high humidity, at this true, are shown in Table 1 described below.

Image Evaluation

The image evaluation of this roller was conducted as in Example 1. The density of the solid black image was decreased under the condition of 10° C. and 15% RH, and the image quality was somewhat deteriorated.

Continuous Energization Test

Furthermore, as in Example 1, the electrical resistance was measured after the continuous energization was conducted. The measurement value was 8.00 [log Ω]. The range of increase due to energization is represented by the difference between electrical resistances at room temperature and normal humidity before and after the continuous energization, and is shown in Table 1 described below. This roller was incorporated again into the image formation device, and gray-scale, solid black, and solid white images were printed under the condition of temperature and humidity of 23° C. and 50% RH, respectively. As a result, both the gray-scale image and the solid black image looked patchy, and a good image was not produced.

TABLE 1

|  | Electrical resistance value at room temperature and normal humidity (logΩ) | Electrically conductive agent (parts by weight) | | Compounding ratio y/x | Range of variation due to environment*1 (logΩ) | Range of increase due to energization*2 (logΩ) | Sum of Range of variation due to environment and Range of increase due to energization (logΩ) |
|---|---|---|---|---|---|---|---|
|  |  | Lithium imide y | Quaternary ammonium salt x |  |  |  |  |
| Example 1 | 7.83 | 0.0045 | 0.333 | 0.0134 | 1.50 | 0.34 | 1.84 |
| Example 2 | 7.98 | 0.0014 | 0.150 | 0.0090 | 1.89 | 0.13 | 2.02 |
| Example 3 | 7.94 | 0.0022 | 0.119 | 0.0188 | 1.64 | 0.39 | 2.03 |
| Example 4 | 8.03 | 0.0022 | 0.086 | 0.0260 | 1.62 | 0.49 | 2.11 |
| Comparative example 1 | 7.78 | 0.0045 | 0.000 | — | 1.11 | 3.26 | 4.37 |
| Comparative example 2 | 7.90 | 0.0000 | 0.333 | 0.0000 | 2.17 | 0.10 | 2.27 |

*1 The difference between the electrical resistance in a low temperature and low humidity (10° C., 15% RH) environment and that in a high-temperature and high-humidity (28° C., 80% RH) environment
*2 The range of increase of electrical resistance when a constant voltage of 1,000 V was applied for 150 hours in a room temperature and normal humidity environment.

Figure 2:
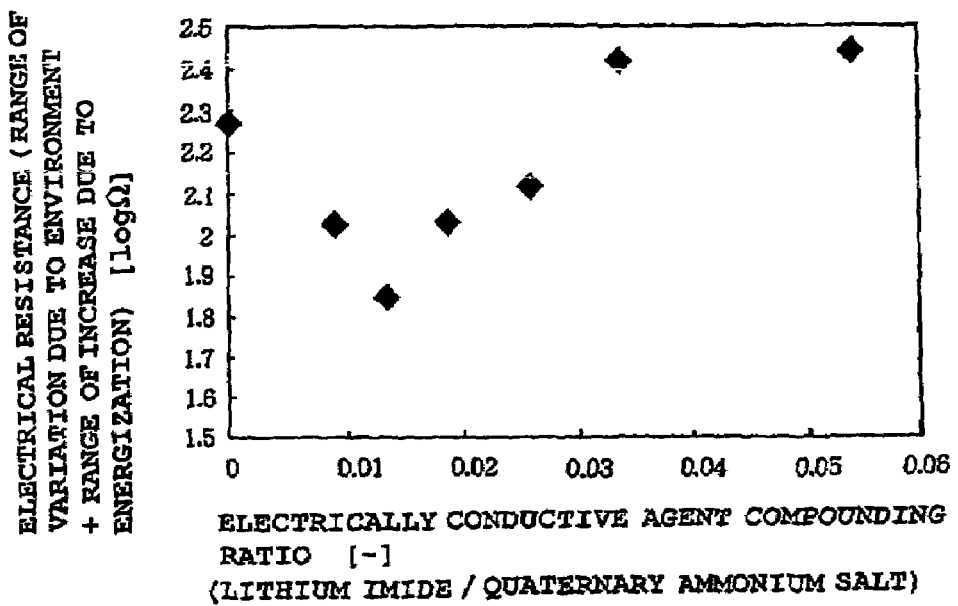
[FIG. 2]

FIG. 2 is a graph indicating the relationship between the electrically conductive agent compounding ratio y/x and the sum of a range of variation due to environment and a range of increase due to energization of the electrical resistance value in the above-described Examples and Comparative examples. In particular, it is suitable that the sum of the ranges of variation of the electrical resistance indicated by the vertical axis is about 2.0 or less, that is, the variations in electrical resistance are about two orders of magnitude (2 log Ω) or less, since good images can be produced.

As shown in the above-described Table 1, an electrically conductive roller having an electrical resistance in the vicinity of about 7.9th power of 10 can be prepared under the condition of room temperature and normal humidity (22° C., 55% RH) by compounding appropriate amounts of lithium imide and quaternary ammonium salt. It was ascertained from Table 1 and FIG. 2 that the most suitable compounding ratio was in the vicinity of 0.0134, and when the lithium imide and the quaternary ammonium salt were compounded at this ratio, an excellent roller exhibiting a sum of a range of variation due to environment and a range of increase due to energization of the electrical resistance significantly lower than those of Comparative examples corresponding to known products was able to be produced.

INDUSTRIAL APPLICABILITY

As described above, according to the present invention, an electrically conductive polymer member can be provided, which is capable of being used stably with small variations in electrical resistance even when its use environment is changed or energization is conducted continuously. A transfer roller and an image forming device can also be provided, which are capable of stably producing good images by using the electrically conductive polymer member.

The invention claimed is:

1. An electrically conductive polymer member, comprising an electrically conductive polymer material prepared by adding a quaternary ammonium salt and a lithium imide to a base polymer, wherein when the amounts of compounding of the quaternary ammonium salt and the lithium imide are assumed to be x parts by weight and y parts by weight, respectively, x and y satisfy the following formula:

$$0.009 \leq (y/x) \leq 0.019.$$

2. The electrically conductive polymer member according to claim 1, wherein the base polymer comprises a polyether polyol and polytetramethylene ether glycol.

3. The electrically conductive polymer member according to claim 1, wherein the quaternary ammonium salt is a quaternary ammonium salt of a weak acid group.

4. The electrically conductive polymer member according to claim 3, wherein the weak acid group is an alkylsulfate ion, a carboxylate ion, a borate ion, or a carbonate ion.

5. A transfer roller, comprising the electrically conductive polymer member according to claim 1.

6. An image forming device, comprising the transfer roller according to claim 5.

* * * * *